United States Patent
McLeod et al.

(10) Patent No.: US 10,861,264 B2
(45) Date of Patent: Dec. 8, 2020

(54) SYSTEMS AND METHODS OF LOCK AND POWERED LOAD ENUMERATION AND SECURE ACTIVATION

(71) Applicant: Sensormatic Electronics, LLC, Boca Raton, FL (US)

(72) Inventors: Murdo Jamie Scott McLeod, Belfast (GB); Ian R. Schofield, Down (GB); Timothy J. Harrison, Lisburn (GB)

(73) Assignee: Sensormatic Electronics, LLC, Boca Raton, FL (US)

( * ) Notice: Subject to any disclaimer, the term of this patent is extended or adjusted under 35 U.S.C. 154(b) by 194 days.

(21) Appl. No.: 16/204,239

(22) Filed: Nov. 29, 2018

(65) Prior Publication Data
US 2020/0175792 A1 Jun. 4, 2020

(51) Int. Cl.
| | |
|---|---|
| H02M 7/04 | (2006.01) |
| G07C 9/00 | (2020.01) |
| G07C 9/20 | (2020.01) |
| E05B 47/00 | (2006.01) |
| H02J 1/14 | (2006.01) |
| H02J 7/00 | (2006.01) |

(52) U.S. Cl.
CPC ...... *G07C 9/00309* (2013.01); *E05B 47/0001* (2013.01); *G07C 9/00571* (2013.01); *G07C 9/215* (2020.01); *H02J 1/14* (2013.01); *H02J 7/0063* (2013.01); *G07C 2009/00412* (2013.01); *G07C 2009/00634* (2013.01)

(58) Field of Classification Search
CPC ...... G07C 9/00571; G07C 2009/00634; G07C 9/215; G07C 2009/00412; G07C 9/00309; E05B 47/0001; H02J 1/14; H02J 7/0063; G08B 21/185; G08B 7/06

USPC ........................................................ 307/52
See application file for complete search history.

(56) References Cited

U.S. PATENT DOCUMENTS

| | | | |
|---|---|---|---|
| 4,706,084 A | 11/1987 | Meyers et al. | |
| 5,248,958 A | 9/1993 | Milin | |
| 5,616,966 A | 4/1997 | Fischer et al. | |
| 5,889,471 A | 3/1999 | Glehr et al. | |
| 6,285,912 B1 | 9/2001 | Ellison et al. | |

(Continued)

FOREIGN PATENT DOCUMENTS

| | | |
|---|---|---|
| FR | 2604045 | 3/1988 |
| GB | 2 250 052 | 5/1992 |
| WO | WO-2015/101687 A1 | 7/2015 |

OTHER PUBLICATIONS

Extended European Search Report on EP Application No. 19155619.0, dated Mar. 14, 2019, 8 pages.

*Primary Examiner* — Alfonso Perez Borroto
*Assistant Examiner* — Esayas G Yeshaw
(74) *Attorney, Agent, or Firm* — Foley & Lardner LLP

(57) ABSTRACT

A load control system includes a power supply, a load controller coupled to a load, and a supply controller. The load controller receives a first power having a first current level from the power supply, and uses the first power to cause a plurality of resistors to output a plurality of pre-defined codes. The supply controller receives the plurality of pre-defined codes, evaluates an output condition based on the plurality of pre-defined codes, and causes the power supply to output a second power having a second current level greater than the first level responsive to the plurality of pre-defined codes satisfying the output condition.

20 Claims, 6 Drawing Sheets

(56) References Cited

U.S. PATENT DOCUMENTS

2010/0052928 A1  3/2010 Tabib
2015/0349657 A1* 12/2015 Kuo ................. H02M 7/53873
                                                   363/84
2017/0031407 A1* 2/2017 Sander ................. G06F 13/385

* cited by examiner

SYSTEMS AND METHODS OF LOCK AND POWERED LOAD ENUMERATION AND SECURE ACTIVATION

BACKGROUND

Access control restricts entrance to a property, building, facility, room, zone, or other physical location to authorized persons. Access control can be achieved by restricting entrance through a variety of access control points such as doors, turnstiles, parking gates, elevators, or other physical barriers where granting access can be electronically controlled.

SUMMARY

One implementation of the present disclosure is a load control system. The load control system includes a power supply, a load controller coupled to a load, and a supply controller. The load controller receives a first power having a first current level from the power supply, and uses the first power to cause a plurality of resistors to output a plurality of pre-defined codes. The supply controller receives the plurality of pre-defined codes, evaluates an output condition based on the plurality of pre-defined codes, and causes the power supply to output a second power having a second current level greater than the first level responsive to the plurality of pre-defined codes satisfying the output condition.

Another implementation of the present disclosure is a method. The method includes setting, by at least one of a supply controller and a power supply, a current limit of the power supply to a first value; connecting, by the supply controller, the power supply to a load controller; generating, by the load controller, a plurality of pre-defined codes using a first power having a first current level less than or equal to the first value of the current limit; receiving, at the supply controller, the plurality of pre-defined codes; evaluating, by the supply controller, an output condition based on the plurality of pre-defined codes; and connecting, by the supply controller, the load to the power supply responsive to the plurality of pre-defined codes satisfying the output condition.

Another implementation of the present disclosure is a load control system. The load control system includes a power supply and a supply controller. The supply controller causes the power supply to output a first power having a current level limited to a first value, receives a plurality of pre-defined codes from a load controller coupled to a load, evaluates an output condition based on the plurality of pre-defined codes, and causes the power supply to output a second power limited to a second current level greater than the first level responsive to the plurality of pre-defined codes satisfying the output condition.

This summary is illustrative only and is not intended to be in any way limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
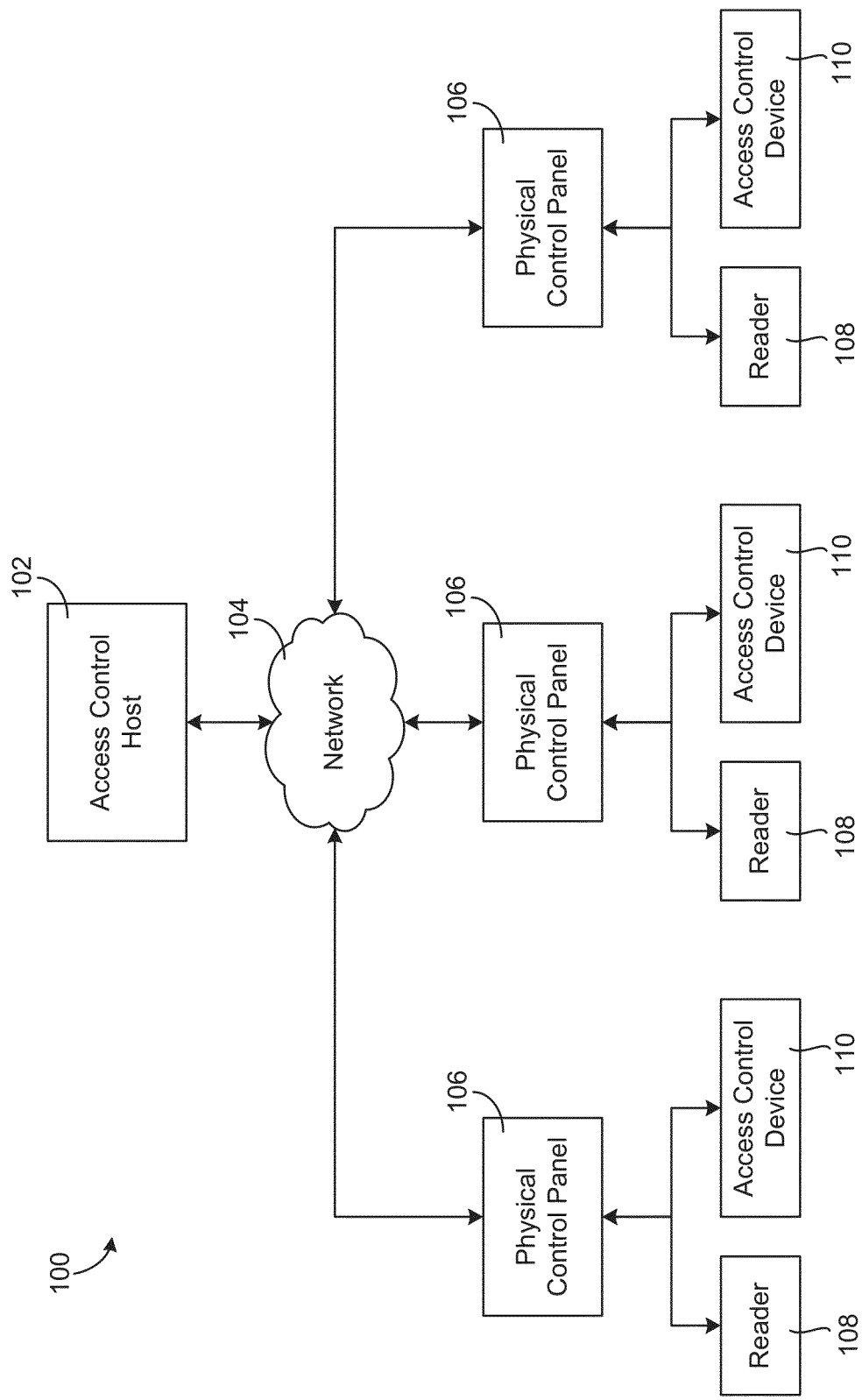
FIG. 1 is a block diagram of an access control system that can use a lock and powered load enumeration and secure activation system, according to an embodiment of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates generally to the field of access control systems, and more particularly to systems and methods of lock and powered load enumeration and secure activation. Referring generally to the figures, an access control system can control electronic locks and other loads by delivering power from a power supply to the load. In existing systems, the locks and loads may be directly controlled from the power supply source. This can result in a lack of over-current protection to prevent brown-outs; a lack of functionality regarding planned currently delivery or dynamic allocation; uncertainty as to whether the load connected is of a correct type or manufacturer; and/or the load being unsafe to connect and/or not functioning properly. For example, access control systems may have generic or universal connections that can allow an installer to connect a wide variety of locks or loads to the access control system, even if the connected lock or load may not be able to function properly with the access control system, including to draw an appropriate current from the access control system when activated.

The present solution can enable access control systems to more effectively manage power delivery to locks and loads, including to budget power delivery and power supply (e.g., battery) usage based on identifying specific parameters of the lock and/or load connected to the access control system. In some embodiments, the present solution does not increase the amount or complexity of wiring, and can be retrofitted into already installed systems. The present solution can enable access control systems to verify origin and type of locks or loads to prevent future over-current situations, and to verify that the equipment in use is authentic. In some embodiments, the present solution enables a very low level of current to power a small circuit in the load; subsequently, a series of codes can be signaled back from the load to the power supply, which can be verified to determine whether to activate a higher level of power supply and current limit to connect the load to the full supply. By implementing various such features, the present solution can enable over-current protection to prevent brown-outs, plan current delivery and/or make dynamic current allocation to the loads connection (e.g., battery re-charging can be accelerated by using any spare current, or restricted to maintain service), reduce or eliminate uncertainty regarding the type, manufacturer, or other parameters of the load, and effectively report errors if the load is unsafe or otherwise incompatible with the access control system.

In some embodiments, the access control system includes one or more access control points. Each access control point can include a physical control panel, one or more readers, and one or more access control devices. The physical control panel can be connected to the readers and the access control devices via a hardwired serial connection. The readers can include proximity card readers, biometric readers, keypads, or other input device configured to receive a credential from a user (e.g., by reading an access badge, receiving a PIN, scanning a fingerprint, etc.). The access control devices can include electronic locks, actuators, or other controllable devices that can be operated to automatically grant or deny access through the access control points. For example, a door access control point can include an electronic lock configured to lock and unlock the door in response to a control signal from the physical control panel.

In some embodiments, the physical control panel can receive the credential data from the reader and send the credential data to a central access control host (e.g., an access control server). The access control host can determine whether to grant or deny access by comparing the credential to an access control list. The access control host can send a result of the determination (e.g., grant or deny access) to the physical control panel, which operates the access control devices accordingly. For example, the physical control panel can unlock an electronic lock in response to receiving a control signal from the access control host.

Access Control Systems

Referring now to FIG. 1, an access control system 100 is depicted. Access control system 100 monitors and controls access to various locations in or around a building (e.g., rooms or zones in a building, parking structures, etc.) using a collection of access control points. Each access control point is shown to include a physical control panel 106, a reader 108, and an access control device 110. Physical control panels 106 can be connected to readers 108 and access control devices 110 via a hardwired serial connection (e.g., RS-485 serial communication lines).

Readers 108 can receive credential data from a user via an access control card of a user. For example, readers 108 can read a smartcard (e.g., in integrated circuit card) possessed by a user to automatically obtain the credential data, such as an identifier of the user (user ID), from the smart card. The reader 108 can receive the user ID based on receiving a personal identification number (PIN). The reader 108 can receive the user ID based on biometric data (e.g., using facial recognition, gait recognition, iris recognition, fingerprint recognition). The reader 108 can receive the user ID from several of such sources (e.g., smart card, PIN, biometric data).

Access control devices 110 can include electronic locks, actuators, or other controllable devices that can be operated to automatically grant or deny access through the access control points. For example, a door access control point can include an electronic lock configured to lock and unlock the door in response to a control signal from the physical control panel. In some embodiments, access control devices 110 are distributed throughout a building or campus (i.e., a group of buildings). Each access control device 110 can be configured to control a particular access point (e.g., a doorway, a parking structure, a building entrance or exit, etc.).

User interactions with readers 108 (i.e., access requests) can be recorded as events and sent to access control host 102 via a communications network 104 (e.g., a TCP/IP network, a building automation and control network, a LAN, a WAN, etc.). Each event may include, for example, a timestamp, a device ID identifying the access control device 110, a security credential provided by the user at the access point (e.g., a smartcard ID, an access code, etc.), a user ID, and/or any other information describing the access request. Access control host 102 can process the events and determine whether to allow or deny the access request. In some embodiments, access control host 102 accesses a security database to determine whether the security credential provided by the user matches a stored security credential. In some embodiments, access control host 102 determines whether the user associated with the access request (e.g., defined by the user ID or smartcard ID) is authorized to access the area controlled by the access control device 110. In some embodiments, access control host 102 displays an alarm or prompt for a security workstation (e.g., a computer operated by security personnel) to allow or deny the access request.

Various devices described herein, including the access control host 102 and the load control systems 200, 400 described below, can include a processing circuit and/or a communications circuit. The processing circuit can include a processor and memory. The processor can be a general purpose or specific purpose processor, an application specific integrated circuit (ASIC), one or more field programmable gate arrays (FPGAs), a group of processing components, or other suitable processing components. The processor can execute computer code or instructions stored in memory or received from other computer readable media (e.g., CDROM, network storage, a remote server, etc.). The memory can include one or more devices (e.g., memory units, memory devices, storage devices, etc.) for storing data and/or computer code for completing and/or facilitating the various processes described in the present disclosure. Memory can include random access memory (RAM), read-only memory (ROM), hard drive storage, temporary storage, non-volatile memory, flash memory, optical memory, or any other suitable memory for storing software objects and/or computer instructions. Memory can include database components, object code components, script components, or any other type of information structure for supporting the various activities and information structures described in the present disclosure. Memory can be communicably connected to processor via processing circuit and may include computer code for executing (e.g., by the processor) one or more processes described herein. When processor executes instructions stored in memory, the processor generally configures the processing circuit) to complete such activities.

The communications circuit can include wired or wireless interfaces (e.g., jacks, antennas, transmitters, receivers, transceivers, wire terminals, etc.) for conducting data communications with various systems, devices, or networks. For example, the communications circuit can include an Ethernet card and port for sending and receiving data via an Ethernet-based communications network. As another example, the communications circuit can include a WiFi transceiver for communicating via a wireless communications network. The communications circuit can communicate via local area networks (e.g., a building LAN), wide area networks (e.g., the Internet, a cellular network, etc.), and/or conduct direct communications (e.g., NFC, Bluetooth, etc.). In various embodiments, the communications circuit can conduct wired and/or wireless communications. For example, the communications circuit can include one or more wireless transceivers (e.g., a Wi-Fi transceiver, a Bluetooth transceiver, a NFC transceiver, a cellular transceiver, etc.) for communicating with access control host 102 via communications network 104.

Lock and Powered Load Enumeration and Secure Activation Systems and Methods

Figure 2:
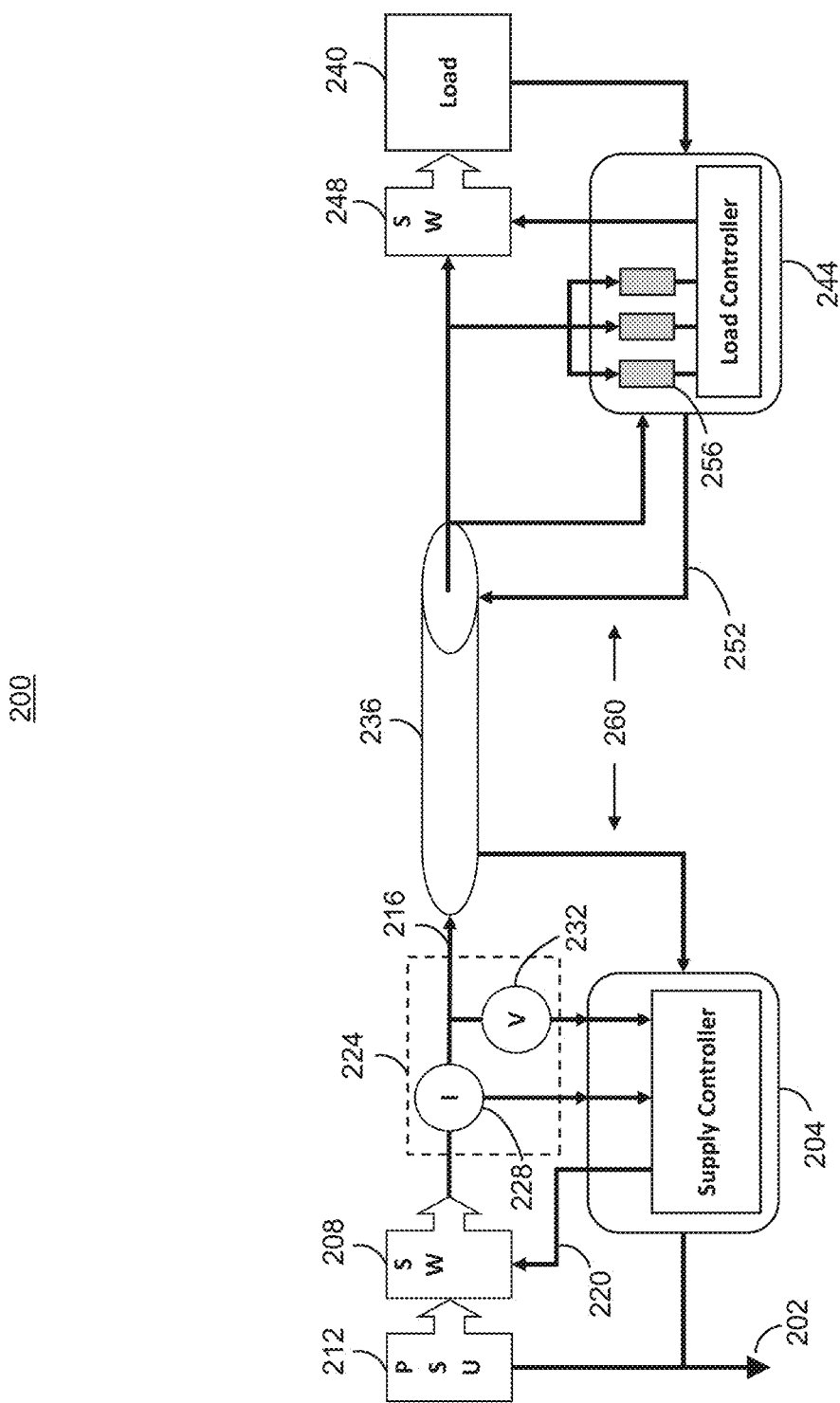
FIG. 2 is a block diagram of a load control system, according to an embodiment of the present disclosure.

Referring now to FIG. 2, a load control system 200 is depicted. The load control system 200 can be implemented by and/or using features of the access control system 100 described with reference to FIG. 1. The load control system 200 can be implemented to selectively power loads that may not be part of an access control system. The load control system 200 includes a supply controller 204 coupled to a switch 208 coupled to a power supply 212. The supply controller 204 can include a microcontroller. The supply controller 204 can control operation of the switch 208 to selectively deliver power 216 from the power supply 212. The switch 208 can include an electronic switch that can change from an ON state to an OFF state (and/or vice-versa) responsive to receiving a switch control signal 220 from the supply controller 204. The switch 208 can include a relay switch. The switch 208 can include a field effect transistor (FET) switch.

The power supply 212 can include a portable power source, such as a battery. The power supply 212 can include a connection to a remote power source, such as mains power. As depicted in FIG. 2, the power supply 212 and supply controller 204 can be coupled to ground 202. In some embodiments, the power supply 212 includes a current limiter. The supply controller 204 can control operation of the current limiter to cause the power supply 212 to deliver power 216 up to a threshold amount unless an output condition is satisfied. As described herein, the supply controller 204 can verify security of load 240 to determine whether the output condition is satisfied (and thus determine to allow the power supply 212 to deliver full power for use by load 240).

The access control system 200 can include at least one sensor 224 coupled to the switch 208 and the supply controller 204. The at least one sensor 224 can detect a current 228 and a voltage 232 associated with the power 216 delivered from the power supply 212. For example, the at least one sensor 224 can detect a current being delivered to load 240; the at least one sensor 224 can detect a voltage being suppled at an output of the supply controller 204. In some embodiments, the at least one sensor 224 includes at least one analog-to-digital converter (ADC) that samples an electrical signal and outputs a digital signal corresponding to the electrical signal to the supply controller 204 for digital processing by the supply controller 204.

In some embodiments, power 216 is delivered from the power supply 212 via a circuit path 236 for use by a load 240 (e.g., a lock; a powered load). The circuit path 236 can include an electrical cable. The circuit path 236 can be relatively long, enabling ease of installation and usage of the access control system 200. In some embodiments, the circuit path 236 includes a first connection—a positive voltage connection that delivers current—and a second connection—a zero voltage connection through which the current returns. As such, the circuit path 236 can be analogous to existing connections between the power supply 212 and the load 240, enabling the access control system 200 to be retrofit into existing systems with no cost increase associated with increased wiring.

As depicted in FIG. 2, a load controller 244 is coupled to the circuit path 236 and a switch 248 coupled to the load 240. A current return path 252 couples the load 240 to the load controller 244, the load controller 244 to the circuit path 236, and the circuit path 236 to the supply controller 204.

The load controller 244 can be similar to the supply controller 204. For example, the load controller 244 can be a microcontroller. The load controller 244 can modified the state of the switch 248 (e.g., switch the switch 248 from on to off or vice versa) responsive to detecting an enumeration condition corresponding to operation of the plurality of resistors 256 is satisfied. The enumeration condition can include each resistor 256 completing its respective enumeration communication; a voltage level associated with operation of the load 240 being stable; and/or each timing delay (e.g., as described further with reference to FIG. 3 and FIG. 5) being completed.

The load controller 244 can receive the current-limited power 216 from the power supply 212 and be activated by the current-limited power 216. For example, the threshold amount that the current limiter of the power supply 212 limits the current-limited power 216 to can be set to a value sufficient to activate the load controller 244, but which may be less than an expected power required to operate the load 240.

The load controller 244 can communicate information regarding the load 240 using a plurality of resistors 256. For example, the load controller 244 can execute an enumeration process using the plurality of resistors 256, in which each resistor 256 is caused to output a pre-defined code (e.g., enumeration code). The load controller 244 can connect the plurality of resistors 256 to the power supply 212 (e.g., to use power 216 delivered from power supply 212) to draw pre-defined amounts of current from the power supply 212. The load controller 244 may maintain a plurality of the pre-defined codes (e.g., at least one code corresponding to each resistor 256) in memory, and retrieve the plurality of pre-defined codes for causing the resistors 256 to draw the corresponding pre-defined current from the power supply 212. The pre-defined codes may correspond to various data indicative of the load 240, such as security information, product identifiers, current consumption, and/or operating information. The pre-defined codes can be communicated to the supply controller 204 via a return path 260.

The supply controller 204 can use the at least one sensor 224 to measure the current 228 and voltage 232 corresponding to the pre-defined current drawn by each resistor 256, and thus to calculate the resistance corresponding to operation of each resistor 256 (which corresponds to the enumeration code communicated by each resistor 256). Based on operation of the load controller 244 and the plurality of resistors 256, the supply controller 204 can receive the plurality of the pre-defined codes from the load controller 244, and evaluate an output condition based on the plurality of pre-defined codes.

In some embodiments, the supply controller 204 evaluates the output condition by determining whether the plurality of pre-defined codes match corresponding supply codes (e.g., codes maintained in memory of the supply controller 204). For example, the supply controller 204 can compare the resistance value calculated based on the current 228 and voltage 232 corresponding to operation of each resistor 256 to a predetermined resistance value of a supply code, and determine the pre-defined code to match the supply code responsive to the resistance value being equal to (or within a threshold percentage of) the predetermined resistance value.

In some embodiments, the supply controller 204 executes a pre-processing operation on the pre-defined codes (e.g., on the resistance values calculated based on the current 228 and voltage 232) prior to evaluating the output condition. For example, the supply controller 204 can filter the pre-defined codes. The supply controller 204 can execute a decryption algorithm corresponding to an encryption algorithm that the supply controller 204 expects the load controller 244 to use when operating the plurality of resistors 256.

Responsive to determining the output condition to be satisfied, the supply controller 204 can connect the load 240 to the power supply 212 to enable the power supply 212 to deliver power 216 sufficient for operation of the load 240, such as by deactivating the current limiter of the power supply 212. As such, the supply controller 204 can use the pre-defined codes communicated by the load controller 244 using the plurality of resistors 256 to verify that the load 240 can be securely used with the power supply 212, reducing the likelihood of unsafe operations such as brown-outs.

Referring further to FIG. 2, in some embodiments, various functions of the load control system 200 can be executed using an ASIC. For example, the ASIC can execute the supply controller 204 and/or the load controller 244. The load controller 244 of the ASIC can include an enumeration module that executes the functionality of the plurality of resistors 256.

Figure 3:
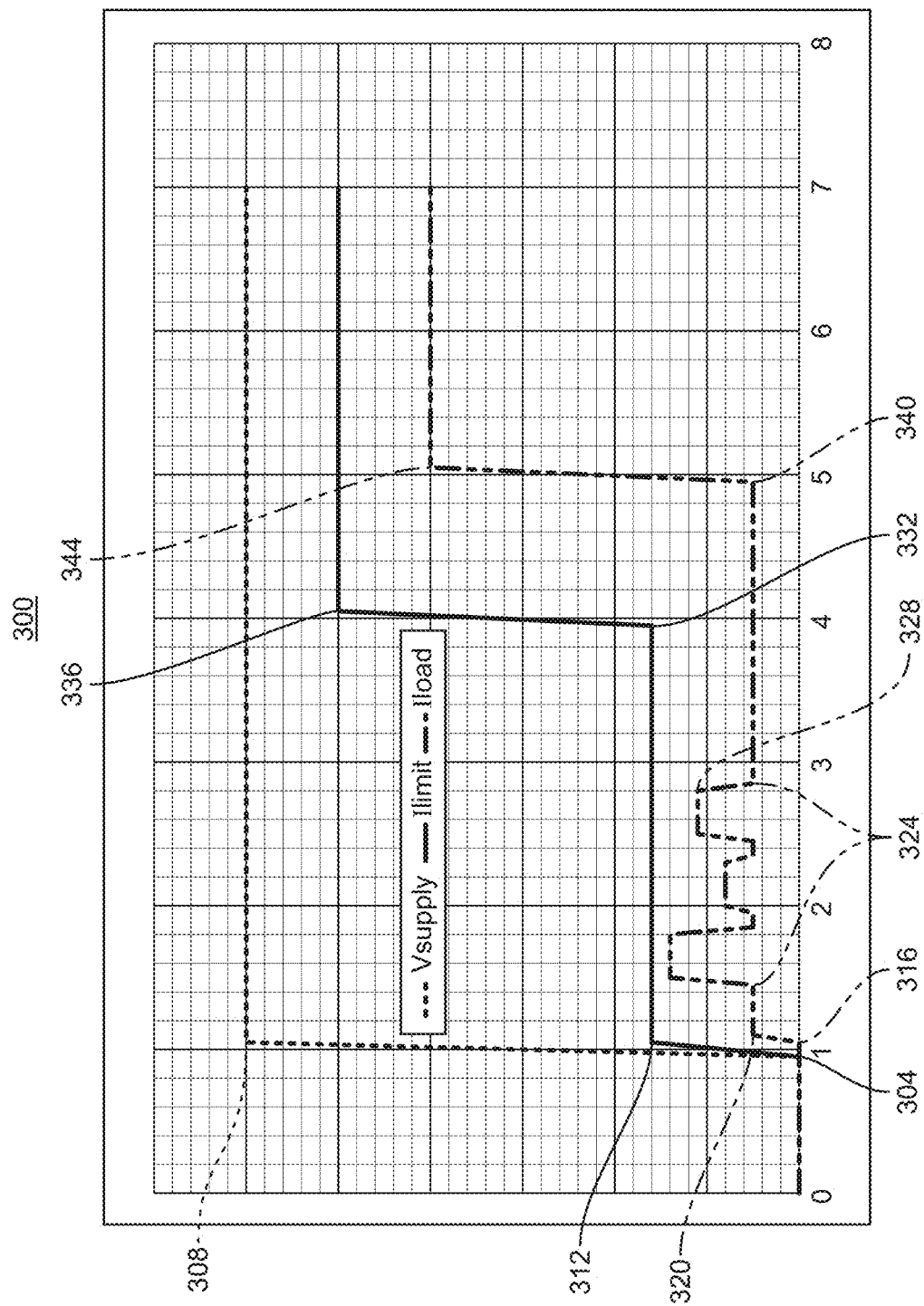
FIG. 3 is a timing diagram of operation of the load control system of FIG. 2.

Referring now to FIG. 3, a timing diagram 300 corresponding to operation of the load control system 200 is depicted. The load control system 200 can perform the depicted operations responsive to receiving a request for power from a load connected to the load control system 200. The load control system 200 can perform the depicted operations at various points in time and/or time delays between operations. At 304, prior to startup (e.g., prior to) the request for power and/or connection of the load, the current from the power supply is zero, the load is zero, and the voltage of the power supply is zero. At 308, subsequent to startup, voltage from the power supply (e.g., direct current (DC) voltage) increases to a nominal supply level. At 312, current from the power supply is limited to a first, relatively low limit value, such as to enable over-current protection and/or prevent the load from drawing sufficient power to operate until security of the load has been verified. At 316, the load controller powers up, using the first limited current from the power supply at a nominal operational level 324. At 328, the load controller uses the plurality of resistors to transmit a plurality of enumeration codes 332 to the supply controller. At 336, having verified the plurality of enumeration codes, the supply controller increases the current limit from the power supply to a second, relatively high value, to enable the load to operate. At 340, the load controller connects the load to the power supply so that the load can draw an operating current 344.

Figure 4:
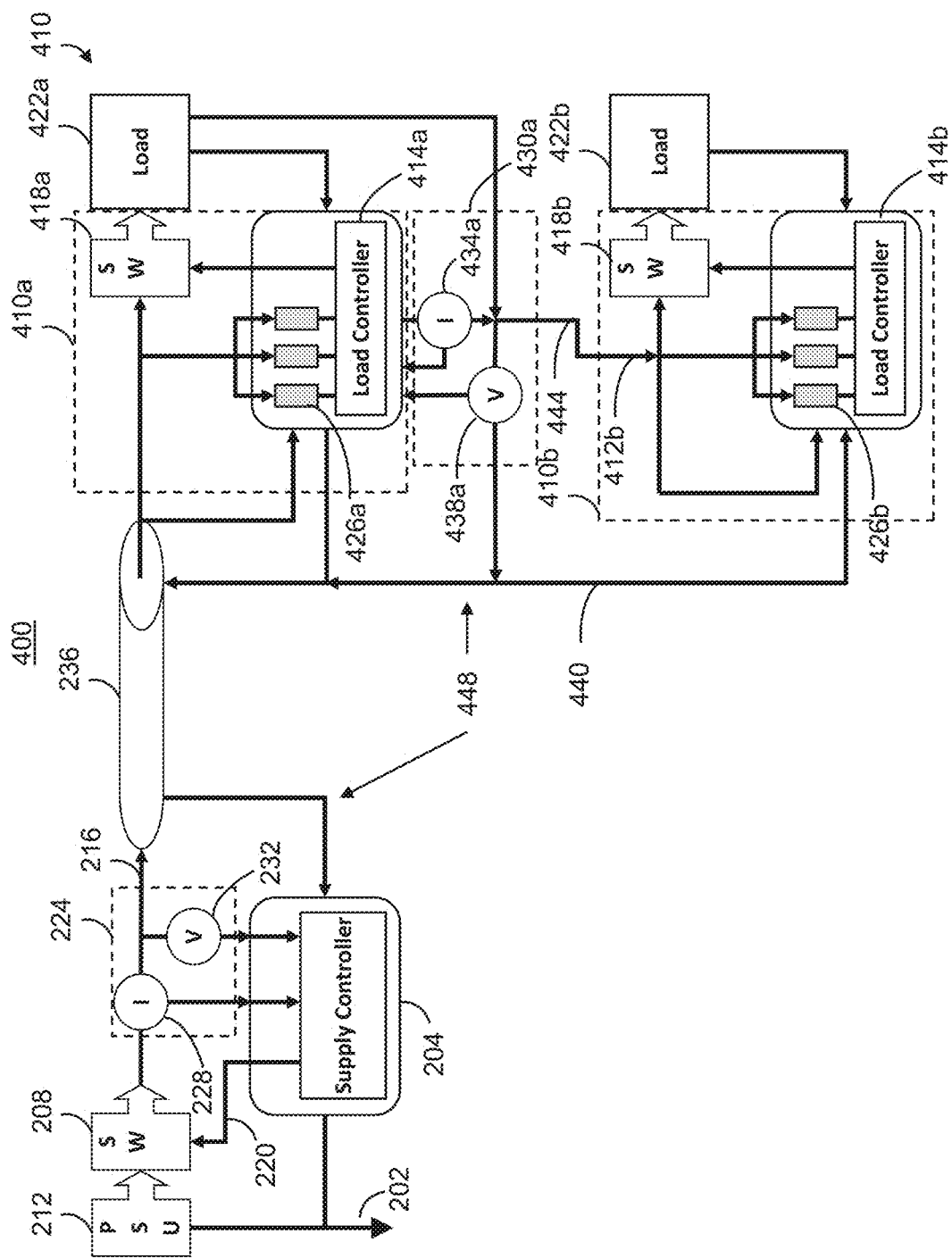
FIG. 4 is a block diagram of a load control system including a plurality of load controllers, according to an embodiment of the present disclosure.

Referring now to FIG. 4, a load control system 400 is depicted. The load control system 400 can incorporate features of the load control system 200 described with reference to FIGS. 2-3. Similar to the load control system 200, the load control system 400 includes a supply controller 204 coupled to a switch 208 and power supply 212 that delivers power 216 via a circuit path 236, and at least one first sensor 224 that can detect a first current 228 and a first voltage 232. The power supply 212 and supply controller 204 can be coupled to ground 202 via respective current return paths.

The load control system 400 includes a plurality of load units 410 including a first load unit 410a and at least one second load unit 410b. The supply controller 204 can control delivery of power 216 to each of the plurality of load units 410 based on pre-defined codes received from each of the plurality of load units 410.

The first load unit 410a includes a first load controller 414a coupled to a first switch 418a coupled to a first load 422a. The first load controller 414a can receive current-limited power 216 via the circuit path 236, and operate a plurality of first resistors 426a to provide a plurality of first pre-defined codes to the supply controller 204.

The at least one second load unit 410b includes a second load controller 414b coupled to a second switch 418 coupled to a second load 422b. The second load controller 414b can receive current-limited power 216 via the circuit path 236 (and the first load 422a) and circuit path 412b, and operate a plurality of second resistors 426b to provide a plurality of second pre-defined codes to the supply controller 204.

In some embodiments, the load control system 400 includes at least one second sensor 430a. The at least one second sensor 430a can detect a second current 434a and a second voltage 438a associated with power delivered to the at least one second load unit 410b (and thus the plurality of second pre-defined codes outputted by the at least one second load unit 410b). As depicted in FIG. 4, the second current 434a and second voltage 438a can be communicated via the circuit path 236 to the supply controller 204 to enable the supply controller 204 to evaluate output conditions for each of the plurality of second load units 410b. Additional second load units 410b may similarly be coupled to the depicted second load unit 410b and to sensors that detect current and voltage corresponding to the pre-defined codes outputted using resistors of the additional second load units 410b.

In some embodiments, the plurality of load units 410 can execute a sequential procedure to communicate respective pre-defined codes to the supply controller 204. A load unit 410 can determine whether it is ready to transmit the pre-defined codes (e.g., based on receiving current-limited power and/or receiving a power request from a corresponding load 422), and transmit the pre-defined codes responsive to determining to be ready. Subsequent to transmitting the pre-defined codes, the load unit 410 can activate downstream load unit(s) 410, such as by activating a current measuring switch analogous to the current limiter of the power supply 212. In some embodiments, the load unit 410 initiates a timer responsive to transmitting the pre-defined codes, compares the timer to a threshold activation time, and activates the load 422 responsive to the timer exceeding the threshold activation time. Each downstream load unit 410 can execute similar steps, such that each load unit 410 transmits its pre-defined codes, waits for the threshold activation time, and then activates the corresponding load 422; once the supply controller 204 has received all of the pre-defined codes (e.g., via current return path 448), the supply controller 204 can determine whether to allow connection of each of the downstream loads 422. As depicted in FIG. 4, a pair of wires 440, 444 can connect each downstream load unit (e.g., second load unit 410b) to each upstream load unit (e.g., first load unit 410a), reducing the wiring and other overhead associated with retrofitting existing systems to operate using the load control system 400.

Figure 5:
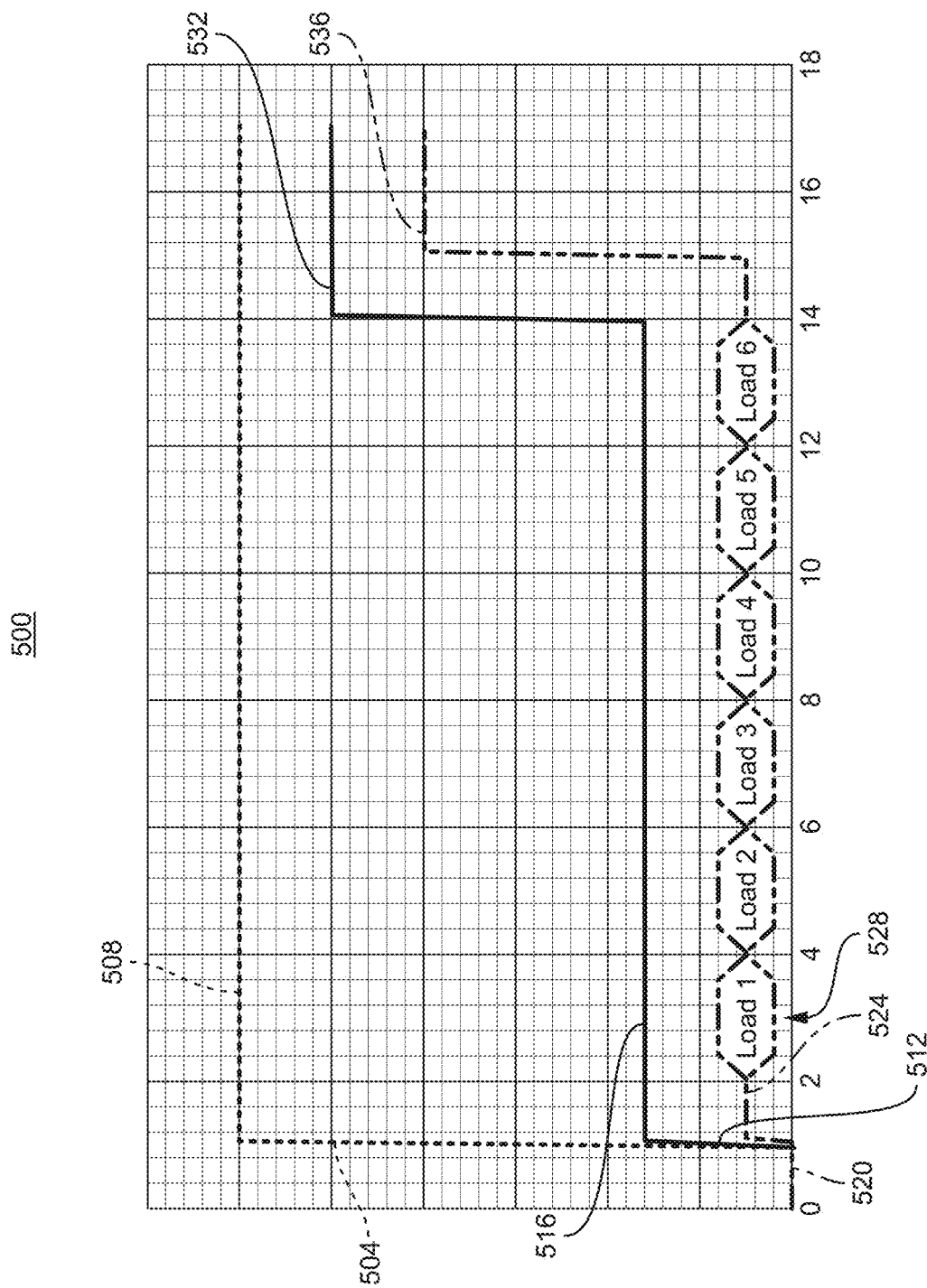
FIG. 5 is a timing diagram of operation of the load control system of FIG. 4.

Referring now to FIG. 5, a timing diagram 500 corresponding to operation of the load control system 400 is depicted. The load control system 400 can perform the depicted operations in a similar manner as described with respect to load control system 200 and FIG. 3, including to selectively provide power to a load based on whether the load is verified. At startup, a voltage 504 from the power supply increases to a nominal voltage level 508, a current 512 from the power supply is limited to a first, relatively low limit value 516 (e.g., by operation of a supply controller), and load controllers of a plurality of load units draws an initial current 524 less than the limit value 516. The load controllers use corresponding pluralities of resistors to provide enumeration codes 528 to the supply controller. For example, FIG. 5 depicts each of six load controllers providing enumeration codes to the supply controller. Each load controller may provide various numbers of enumeration codes. Responsive to verifying the received enumeration codes, the supply controller can increase the limit on the current 512 to a second, relatively high value 532, subsequent to which the load controllers can connect respective loads to the power supply to draw current 536.

Figure 6:
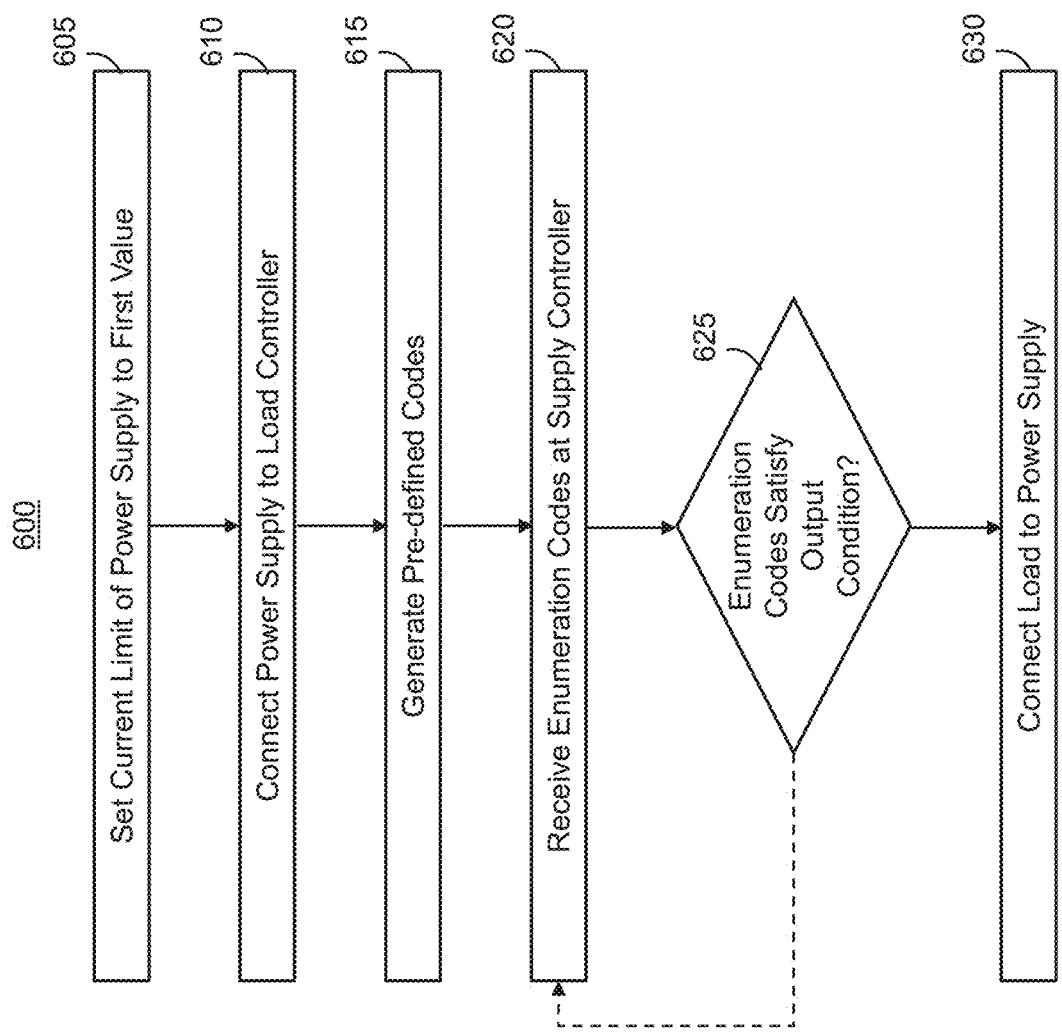
FIG. 6 is a flow diagram of a method of operating a load control system, according to an embodiment of the present disclosure.

Referring now to FIG. 6, a method 600 of operating a load control system is depicted. The method 600 can be executed using various load control systems described herein, including load control systems 200, 400. The method 600 can be performed in accordance with the timing diagrams 300, 500.

At 605, a current limit of a power supply is set to a first value. The current limit can be set by a supply controller. The current limit can be set using a current limiter of the power supply. The first value can be a relatively low value to enable a load controller to operate and less than a value at which a load can operate. The current limit can be set responsive to a load being connected to the load controller.

At 610, the power supply is connected to a load controller to provide power from the power supply to the load controller. For example, the supply controller can set a switch to an ON state. The switch may couple the load controller to the power supply via a circuit path.

At 615, the load controller uses the power from the power supply (e.g., relatively low power) to cause a plurality of resistors to provide a plurality of enumeration codes to the supply controller. The enumeration codes may correspond to various data indicative of a load coupled to the load controller, such as security information, product identifiers, current consumption, and/or operating information.

At 620, the supply controller receives the plurality of enumeration codes. In some embodiments, the supply controller uses at least one sensor to detect a current and a voltage of the enumeration codes, such as to calculate a resistance of each code.

At 625, the supply controller evaluates an output condition responsive to receiving the plurality of enumeration codes. The supply controller can compare the resistance value calculated based on the current and voltage corresponding to operation of each resistor to a predetermined resistance value of a supply code, and determine the predefined code to match the supply code responsive to the resistance value being equal to (or within a threshold percentage of) the predetermined resistance value. In some embodiments, the supply controller executes a pre-processing operation on the pre-defined codes (e.g., on the resistance values calculated based on the current and voltage) prior to evaluating the output condition. For example, the supply controller can filter the pre-defined codes. The supply controller can execute a decryption algorithm corresponding to an encryption algorithm that the supply controller expects the load controller to use when operating the plurality of resistors.

At 630, responsive to determining the plurality of enumeration codes to satisfy the output condition, the supply controller can connect the load to the power supply. For example, the supply controller can modify a current limit of the power supply to a second value greater than the first value and/or deactivate the current limit. Responsive to determining the plurality of enumeration codes to not satisfy the output condition, the supply controller may take various actions. As depicted by the dashed line in FIG. 6, the supply controller may continue to evaluate enumeration codes responsive to determining the plurality of enumeration codes to not satisfy the output condition; the supply controller may disconnect the power supply from the load and/or load controller; output an alert indicating the output condition was not satisfied; and/or modify the current limit of the power supply.

In some embodiments, the supply controller receives a plurality of enumeration codes from each of a plurality of load controllers. Each load controller may cause a corresponding plurality of resistors to output the respective enumeration codes. In some embodiments, additional sensors may be used to detect current and/or voltage of each enumeration code for evaluation by the supply controller. In some embodiments, each load controller may wait a predetermined delay subsequent to outputting the plurality of enumeration codes prior to connecting a respective load to the power supply.

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A load control system, comprising:
a power supply;
a load controller coupled to a load, the load controller receives a first power having a first current level from the power supply, and uses the first power to cause a plurality of resistors to output a plurality of pre-defined codes; and
a supply controller that receives the plurality of pre-defined codes, evaluates an output condition based on the plurality of pre-defined codes, and causes the power supply to output a second power having a second current level greater than the first level responsive to the plurality of pre-defined codes satisfying the output condition.

2. The load control system of claim 1, comprising:
the supply controller activates a first switch to couple the power supply to a circuit path coupled to the load controller and the load.

3. The load control system of claim 1, comprising:
a second switch that the load controller activates to couple the load to the power supply.

4. The load control system of claim 1, comprising:
the supply controller includes a memory maintaining a plurality of supply codes and evaluates the output condition based on matching the plurality of pre-defined codes to the plurality of supply codes.

5. The load control system of claim 1, comprising:
at least one sensor detects a current and a voltage of a signal representative of each pre-defined code, and the supply controller extracts the pre-defined code based on the current and voltage.

6. The load control system of claim 1, comprising:
the supply controller at least one of filters and decrypts a signal received from the plurality of resistors representative of a corresponding pre-defined code.

7. The load control system of claim 1, comprising:
the load controller receives the first power from the power supply via a first circuit path and provides the plurality of pre-defined codes to the supply controller via a second circuit path.

8. The load control system of claim 1, comprising:
the supply controller outputs an alert responsive to the plurality of pre-defined codes not satisfying the output condition.

9. The load control system of claim 1, comprising:
the load controller is a first load controller, the load is a first load, and the plurality of pre-defined codes are a plurality of first pre-defined codes; and
at least one second load controller coupled to a respective at least one second load provides a plurality of second pre-defined codes to the supply controller.

10. A method, comprising:
setting, by at least one of a supply controller and a power supply, a current limit of the power supply to a first value;
connecting, by the supply controller, the power supply to a load controller;
generating, by the load controller, a plurality of pre-defined codes using a first power having a first current level less than or equal to the first value of the current limit;
receiving, at the supply controller, the plurality of pre-defined codes;
evaluating, by the supply controller, an output condition based on the plurality of pre-defined codes; and
connecting, by the supply controller, the load to the power supply responsive to the plurality of pre-defined codes satisfying the output condition.

11. The method of claim 10, comprising:
increasing the current limit to a second value greater than the first value responsive to the plurality of pre-defined codes satisfying the output condition.

12. The method of claim 10, comprising:
activating, by the supply controller, a first switch to couple the power supply to a circuit path coupled to the load controller and the load.

13. The method of claim 10, comprising:
maintaining, in memory of the supply controller, a plurality of supply codes; and
evaluating, by the supply controller, the output condition based on matching the plurality of pre-defined codes to the plurality of supply codes.

14. The method of claim 10, comprising:
detecting, by at least one sensor, a current and a voltage of a signal representative of each pre-defined code; and
extracting, by the supply controller, the pre-defined code based on the current and voltage.

15. The method of claim 10, comprising:
at least one of filtering and decrypting, by the supply controller, a signal received from the plurality of resistors representative of a corresponding pre-defined code.

16. The method of claim 10, comprising:
receiving, by the load controller, the first power from the power supply via a first circuit path; and
providing, by the load controller, the plurality of pre-defined codes to the supply controller via a second circuit path.

17. The method of claim 10, comprising:
outputting, by the supply controller, an alert responsive to the plurality of pre-defined codes not satisfying the output condition.

18. The method of claim 10, comprising:
the load controller is a first load controller, the load is a first load, and the plurality of pre-defined codes are a plurality of first pre-defined codes; and
providing, by at least one second load controller coupled to a respective at least one second load, a plurality of second pre-defined codes to the supply controller.

19. A load control system, comprising:
a power supply; and
a supply controller that causes the power supply to output a first power having a current level limited to a first value, receives a plurality of pre-defined codes from a load controller coupled to a load, evaluates an output condition based on the plurality of pre-defined codes, and causes the power supply to output a second power limited to a second current level greater than the first level responsive to the plurality of pre-defined codes satisfying the output condition.

20. The load control system of claim 19, comprising:
the supply controller outputs an alert responsive to the plurality of pre-defined codes not satisfying the output condition.

* * * * *